United States Patent
Tiwari

(10) Patent No.: US 11,479,268 B2
(45) Date of Patent: Oct. 25, 2022

(54) AUTONOMOUS CONTROL OF VEHICLE DRIVING MODES IN CERTAIN TRAFFIC SITUATIONS

(71) Applicant: Toyota Motor Engineering & Manufacturing North America, Inc., Plano, TX (US)

(72) Inventor: Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 111 days.

(21) Appl. No.: 16/943,014

(22) Filed: Jul. 30, 2020

(65) Prior Publication Data
US 2022/0032958 A1    Feb. 3, 2022

(51) Int. Cl.
| | | |
|---|---|---|
| B60W 60/00 | (2020.01) | |
| G08G 1/16 | (2006.01) | |
| B60W 30/09 | (2012.01) | |
| B60W 50/14 | (2020.01) | |
| B60W 30/095 | (2012.01) | |

(52) U.S. Cl.
CPC ........ *B60W 60/0016* (2020.02); *B60W 30/09* (2013.01); *B60W 30/0956* (2013.01); *B60W 50/14* (2013.01); *B60W 60/005* (2020.02); *G08G 1/166* (2013.01); *B60W 2050/143* (2013.01); *B60W 2554/40* (2020.02)

(58) Field of Classification Search
CPC ............ B60W 60/0016; B60W 30/09; B60W 30/0956; B60W 50/14; B60W 60/005; B60W 2050/143; G08G 1/166
See application file for complete search history.

(56) References Cited

U.S. PATENT DOCUMENTS

| | | |
|---|---|---|
| 6,295,492 B1 | 9/2001 | Lang et al. |
| 8,483,909 B2 | 7/2013 | Visconti et al. |
| 8,653,986 B2 | 2/2014 | Tamir et al. |
| 9,082,239 B2 | 7/2015 | Ricci |
| 9,535,878 B1 | 1/2017 | Brinkmann et al. |

(Continued)

FOREIGN PATENT DOCUMENTS

DE    102011109618 A1    2/2013

*Primary Examiner* — Mahmoud S Ismail
*Assistant Examiner* — Gabriel Anfinrud
(74) *Attorney, Agent, or Firm* — Christopher G. Darrow; Darrow Mustafa PC

(57) ABSTRACT

A vehicular hazard mitigation system includes one or more processors and a memory communicably coupled to the processors. The memory may store a vehicular hazard mitigation module including computer-readable instructions that when executed by the processors cause the processors to determine a base vehicle currently driving in an enhanced response driving mode. After determining the base vehicle, at least one alert zone of the base vehicle is determined. A determination is then made as to whether at least one other vehicle is currently in the at least one alert zone of the base vehicle. If at least one other vehicle is currently in the at least one alert zone of the base vehicle, the vehicular hazard mitigation module may autonomously control operation of the base vehicle to shift the driving mode of the base vehicle from the enhanced response driving mode to a non-enhanced response driving mode.

16 Claims, 4 Drawing Sheets

(56) References Cited

U.S. PATENT DOCUMENTS

| | | | |
|---|---|---|---|
| 9,971,348 B1* | 5/2018 | Canavor | G01C 21/3617 |
| 2008/0252487 A1 | 10/2008 | McClellan et al. | |
| 2015/0057883 A1* | 2/2015 | Kelly | B60W 10/00 |
| | | | 701/53 |
| 2015/0145995 A1* | 5/2015 | Shahraray | H04L 67/12 |
| | | | 348/148 |
| 2015/0356872 A1 | 12/2015 | Atsmon et al. | |
| 2016/0121886 A1 | 5/2016 | Eigel | |
| 2017/0195166 A1 | 7/2017 | Keerthi et al. | |
| 2017/0267256 A1* | 9/2017 | Minster | G01C 21/3407 |
| 2017/0285641 A1 | 10/2017 | Goldman-Shenhar et al. | |
| 2017/0313323 A1* | 11/2017 | Tseng | B60W 50/0098 |
| 2018/0188726 A1 | 7/2018 | Newman | |
| 2018/0329414 A1* | 11/2018 | Igarashi | B60W 60/0053 |
| 2018/0361972 A1* | 12/2018 | Zagorski | G05D 1/00 |
| 2019/0164332 A1* | 5/2019 | Matsunobu | G06T 9/00 |
| 2019/0204076 A1* | 7/2019 | Nishi | H04L 67/5651 |
| 2019/0232974 A1* | 8/2019 | Reiley | B60W 60/0013 |
| 2019/0251743 A1* | 8/2019 | Koyama | G01C 21/3635 |
| 2020/0172122 A1* | 6/2020 | Mimura | B60W 60/0055 |

* cited by examiner

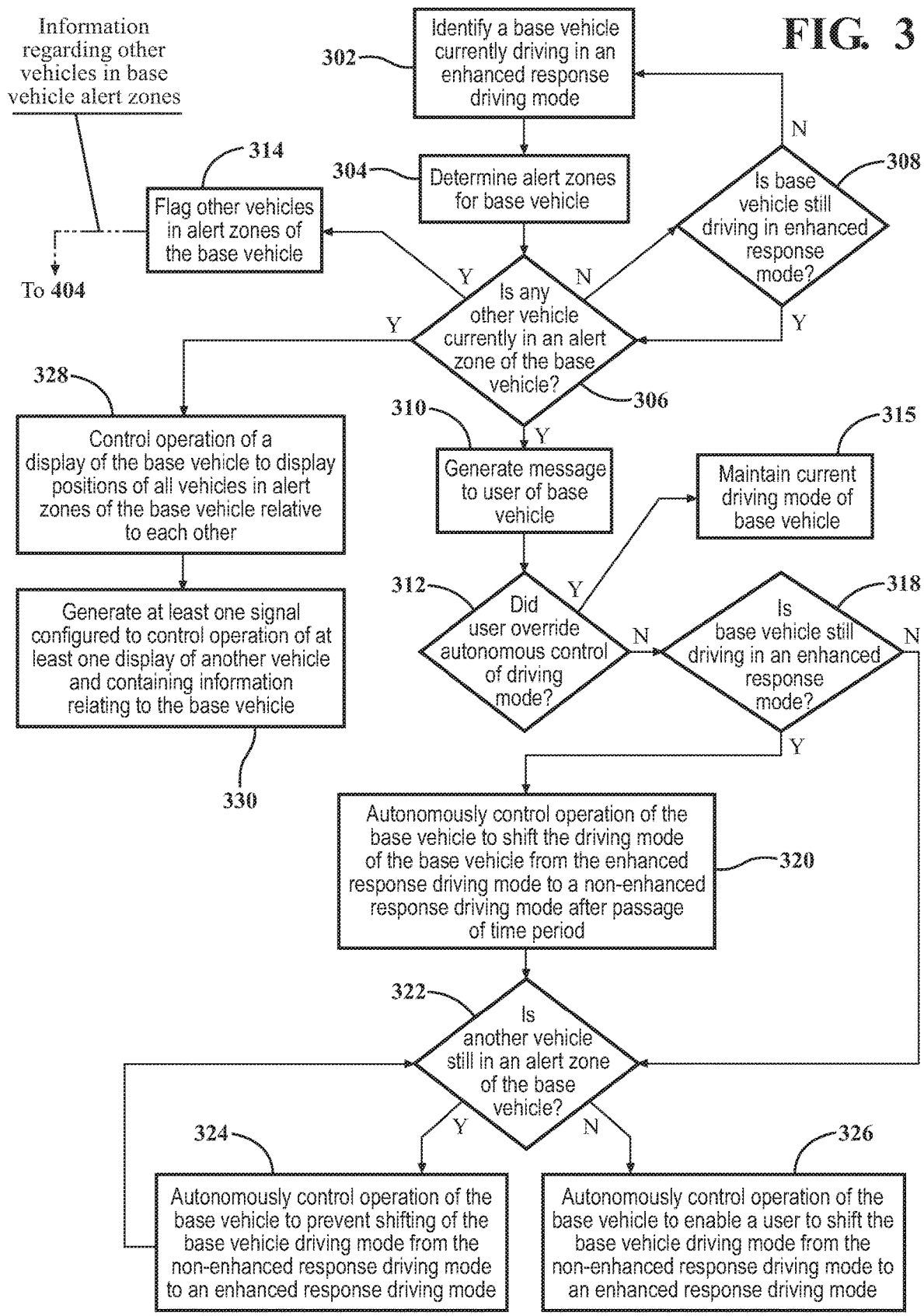

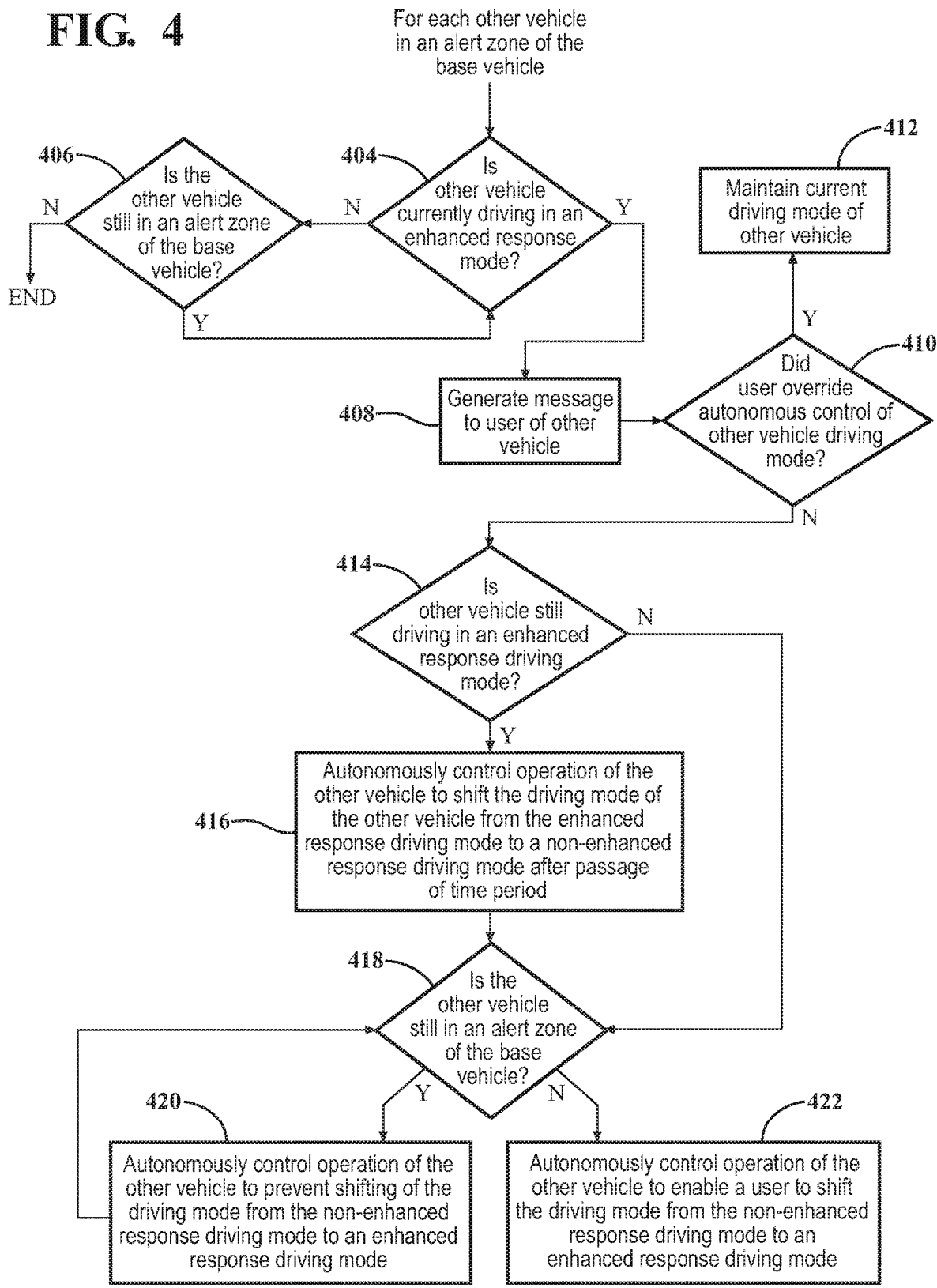

AUTONOMOUS CONTROL OF VEHICLE DRIVING MODES IN CERTAIN TRAFFIC SITUATIONS

TECHNICAL FIELD

The subject matter described herein relates to autonomous control of vehicle driving modes to reduce accident risks in certain traffic situations.

BACKGROUND

Many vehicles have several "driving modes" which are selectable by a user. Essentially, each driving mode comprises a collection of distinctive settings for the various vehicle systems 140. Each collection of settings is selected to provide associated distinctive driving, handling and ride characteristics depending on the personality and preferences of the user. The driving mode may be selectable using dedicated buttons or switches, thus allowing the user to adjust the "personality" of the vehicle. One example of a driving mode may be a sport mode, "super-sport" or "sport-plus" mode, which may enable tighter turns and provide quicker engine response. Operating the vehicle in such modes may encourage more aggressive driving, possibly increasing the likelihood of accidents in cases where the vehicle is driving in the vicinity of other vehicles. The risk may be magnified in situations where multiple relatively closely-spaced vehicles are driving in sport modes.

SUMMARY

In one aspect of the embodiments described herein, a vehicular hazard mitigation system provided. The system includes one or more processors and a memory communicably coupled to the processor(s). The memory may store a vehicular hazard mitigation module including computer-readable instructions that when executed by the processor(s) cause the processor(s) to determine a base vehicle currently driving in an enhanced response driving mode. After determining the base vehicle, at least one alert zone of the base vehicle is determined. A determination is then made as to whether at least one other vehicle is currently in the at least one alert zone of the base vehicle. If at least one other vehicle is currently in the at least one alert zone of the base vehicle, the vehicular hazard mitigation module may autonomously control operation of the base vehicle to shift the driving mode of the base vehicle from the enhanced response driving mode to a non-enhanced response driving mode.

In another aspect of the embodiments described herein, a method of controlling a driving mode of a vehicle is provided. The method includes a step of (a) determining a base vehicle currently driving in an enhanced response driving mode. In a step (b), at least one alert zone of the base vehicle is then determined. In a step (c), a determination is then made as to whether at least one other vehicle is currently in the at least one alert zone of the base vehicle. In a step (d), if at least one other vehicle is currently in the at least one alert zone of the base vehicle, operation of the base vehicle is autonomously controlled to shift the driving mode of the base vehicle from the enhanced response driving mode to a non-enhanced response driving mode. If at least one other vehicle is not currently in the at least one alert zone of the base vehicle, steps (b)-(d) are repeated until the base vehicle is no longer driving in an enhanced response driving mode.

In yet another aspect of the embodiments described herein, a non-transitory computer-readable medium is provided for controlling a driving mode of a vehicle and storing instructions that when executed by one or more processors cause the processor(s) to (a) determine a base vehicle currently driving in an enhanced response driving mode; (b) determine at least one alert zone of the base vehicle; (c) determine if at least one other vehicle is currently in the at least one alert zone of the base vehicle; (d) if at least one other vehicle is currently in the at least one alert zone of the base vehicle, autonomously control operation of the base vehicle to shift the driving mode of the base vehicle from the enhanced response driving mode to a non-enhanced response driving mode; and (e) if at least one other vehicle is not currently in the at least one alert zone of the base vehicle, repeat steps (b)-(e) until the base vehicle is no longer driving in an enhanced response driving mode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 is a flow diagram illustrating operation of an embodiment of a vehicular hazard mitigation module in controlling a driving mode of a base vehicle.

FIG. 4 is a flow diagram illustrating operation of an embodiment of a vehicular hazard mitigation module in controlling a driving mode of another vehicle driving in proximity to the base vehicle.

DETAILED DESCRIPTION

Embodiments described herein relate to a system for mitigating driving hazards in a relatively closely-spaced cluster of vehicles in which one or more of the vehicles are driving in an enhanced response driving mode (i.e., a "sport" mode, "sport-plus" mode, etc.). The system includes a vehicular hazard mitigation module designed to identify or determine a base vehicle currently driving in an enhanced response driving mode. After identifying a base vehicle that is currently driving in an enhanced response driving mode, at least one alert zone of the base vehicle is determined. A determination is then made as to whether at least one other vehicle is currently in the at least one alert zone of the base vehicle. If at least one other vehicle is currently in the at least one alert zone of the base vehicle, the module may autonomously control operation of the base vehicle to shift the driving mode of the base vehicle from the enhanced response driving mode to a non-enhanced response driving mode. This shifting of the base vehicle driving mode out of a mode that accommodates a more aggressive driving style may aid in preventing accidents by making a driver more aware of his surroundings and also by discouraging aggressive maneuvers that may be attempted when the vehicle is in a more responsive/faster reacting driving mode. Certain embodiments of the vehicular hazard mitigation module may also be configured to control the driving modes of one or more other vehicles to similarly shift these vehicle(s) out of enhanced response driving modes while these vehicles are driving in the "cluster" (i.e., in the vicinity of the base vehicle).

Figure 1:
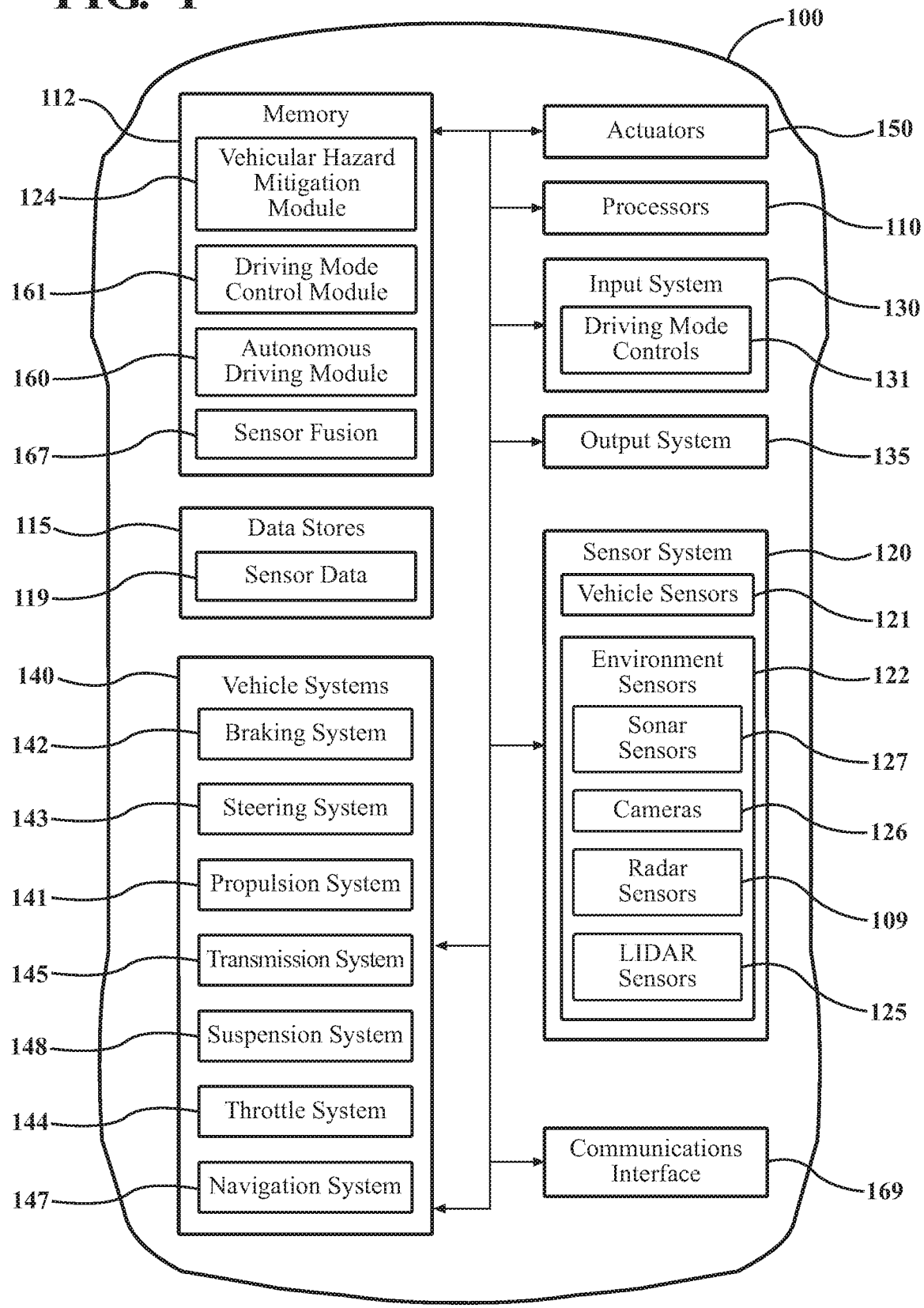
FIG. 1 is a block schematic diagram of a vehicle incorporating a vehicular hazard mitigation module and other elements of a vehicular hazard mitigation system in accordance with embodiments described herein.

Referring to FIG. 1, an example of a vehicle 100 is illustrated. As used herein, a "vehicle" is any form of motorized transport. In one or more implementations, the vehicle 100 is a passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a vehicular hazard mitigation system in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to an edge device or to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, other vehicles, etc. As an example, in one or more arrangements, the environment sensors 122 can include one or more radar sensors 109, one or more LIDAR sensors 125, one or more cameras 126, and/or sonar sensors 127. Environment sensors 122 may be configured to detect aspects of road geometry, road grade/slope, traffic conditions, movements and characteristics of other vehicles, and other external events and conditions.

Environment sensors such as radar 109, LIDAR 125, camera(s) 126, and/or other sensors may also be usable to monitor the speed, acceleration, position, relative positions (i.e., with respect to the vehicle 100) and other characteristics of one or more front or lateral vehicle(s) traveling in proximity to the vehicle 100. A "front vehicle" may be another vehicle driving in within a predetermined distance from the vehicle 100 immediately in front of the vehicle 100 and in the same lane. A "lateral vehicle" may be a another vehicle driving in either lane (i.e., right or left) immediately adjacent to the lane in which vehicle 100 is driving, and either ahead of or behind the vehicle 100. Environment sensors 122 may be configured to detect activation and deactivation of turn signals, brake lights, and other signals mounted on other vehicles or along a road. Environment sensors 122 may be configured to detect the presence of traffic control elements such as traffic lights, signage, etc., and to interpret and process any indications or messages conveyed by such elements.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, edge devices, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge devices, and other information sources and entities. Information such as sensor data, traffic information, road condition information, weather information, and other types of information may be transmitted and received via the communications interface 169. If required, wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In certain arrangements, the input system may be configured to serve as an interface enabling and/or facilitating user control of the vehicle driving mode. The input system may be configured to receive instructions regarding the driving mode from a user and to communicate driving mode instructions to a driving mode control module 161, to the autonomous driving module(s) 160 and/or to any other element(s) or system(s) configured to implement any driving mode control functions. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In embodiments described herein, a memory 112 may store autonomous driving module(s) 160, a driving mode control module 161, and a vehicular hazard mitigation module 124. The memory 112 is a random-access memory (RAM), read-only memory (ROM), a hard-disk drive, a flash memory, or other suitable memory for storing the modules 160, 161, 124. The modules 160, 161 124 are, for example, computer-readable instructions that when executed by the processor 110, cause the processor(s) 110 to perform the various functions disclosed herein. Additional modules (not shown) may also be stored in memory 112.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the vehicle 100 so as to drive the vehicle along a travel route, from an initial or start location to a destination.

The processor(s) 110, the autonomous driving module 160, the vehicular hazard mitigation module 124, the driving mode control module 161 and/or other modules described herein can be operably connected to communicate with each other and with the other elements of the vehicle, including various vehicle systems 140 and/or individual components thereof. For example, referring to FIG. 1, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, the driving mode control module 161, the vehicular hazard mitigation module 124 and/or other elements of the vehicle may control some or all of the vehicle systems 140 and, thus, may be partially or fully autonomous.

The processor(s) 110, the autonomous driving module(s) 160, and the navigation system 147 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

Many vehicles have several "driving modes" which are selectable by a user. Essentially, each driving mode comprises a collection of distinctive settings for the various vehicle systems 140. Each collection of settings is selected to provide associated distinctive driving, handling and ride characteristics depending on the personality and preferences of the user. Designations (i.e., names or labels) and detailed control settings of different driving modes may differ with vehicle make and model. The driving mode may be selectable using dedicated buttons or switches, thus allowing the user to adjust the "personality" of the vehicle.

Examples of driving modes may be a normal mode, comfort mode, sport mode, "super-sport" or "sport-plus" mode, and an economy mode. In some vehicle, the user may be enabled to adjust vehicle system settings to produce one or more customized driving modes. The normal mode may be a default driving mode and may provide a balance between comfort and sport modes. In the normal driving mode, the settings and responses of the vehicle systems may be the same as they would be if the vehicle had no selectable driving modes. For the comfort mode, one or more vehicle systems may be adjusted so as to provide the softest available ride and smoothest drive. For example, the suspension system may be adjusted to its "softest" setting, the transmission system may be adjusted so that gear changes are performed earlier to eliminate higher engine revs, and the steering system may be adjusted to provide a higher steering ratio. For the economy mode, the propulsion, transmission, and other vehicle systems may be adjusted to operate so to maximize fuel economy.

For the sport mode, vehicle systems may be adjusted to stiffen the ride and reduce body roll at higher speeds and in sharper turns. The transmission system may be adjusted so that gear changes are performed at higher engine revs and so that downshifts occur more quickly. The throttle system may be adjusted so that engine response is more rapid when the accelerator pedal is pressed. For a "super-sport" or "sport-plus" mode may be a mode, the same system settings as for the "sport mode" may be applied, but in addition, features such as traction control and stability control may be disengaged or modified to reduce their effects on the ride. Some vehicles may also permit a user to customize vehicle system responses so that individual vehicle systems may have response characteristics associated with different selectable drive modes. For example, the user may configure the vehicle systems so that the engine operates in normal mode and the transmission and steering in comfort mode.

For purposes described herein, "sport" modes such as "sport", "super-sport", "sport-plus" or any designation given to a driving mode which facilitates relatively rapid engine response, stiffer ride, reduced roll, and other characteristics of "sport" driving are referred to as "enhanced response driving modes". Such driving modes may facilitate driving maneuvers such as rapid lane changes and lateral position shifts, quick straight-line acceleration, and other maneuvers which may increase the risk of accidents in a driving environment where one or more other vehicles are driving and within a certain predetermined distance of the vehicle 100. When the vehicle 100 is in such driving situations, the driving mode may be changed autonomously or manually to a different, "non-enhanced response driving mode" (i.e., a driving mode such as comfort, normal, etc.) which does not provide the enhanced response characteristics of the sport driving modes. This may reduce the tendency of a driver to engage in "sport"-like driving maneuvers in situations where the vehicle 100 is relatively close to one or more other vehicles.

In one or more arrangements, driving mode controls may be embodied in the driving mode controls 131 of the input system 130. Alternatively, the driving mode controls may be hard-wired into the vehicle control console. Other arrangements are also possible. Actuation of the controls operates to implement a chosen collection of vehicle system settings by electronically controlling one or more of the vehicle systems 140.

The vehicle 100 may include a driving mode control module 161 configured to coordinate control of the individual vehicle system settings to provide a desired combination of vehicle responses. The driving mode control module 161 may operate responsive to user selection of a driving mode, to control operation of the vehicle systems 140 to provide a combination of system responses associated with a selected driving mode. Particular response characteristics and/or ranges of response characteristics associated with each selectable driving mode may be saved in a memory, such as memory 112. In particular embodiments, the driving mode control module 161 may be configured to interface wirelessly with an edge device (such as edge device 210 described herein) for remote control of the vehicle driving mode.

Coordination of control of the individual vehicle system settings to provide a desired combination of vehicle responses may be controlled by an ECU (electronic control unit) of the vehicle. In one or more arrangements, a dedicated control unit (such as driving mode control module 161) may be provided for coordinating control of vehicle systems to provide user-selected driving modes. In one or more arrangements, control of the vehicle systems to provide user-selected driving modes may be performed by the autonomous driving module(s) 160. In other arrangements, a combination of controllers may be used to provide selected driving modes. Other methods of controlling the driving mode in response to user desires (as expressed by user control commands) may also be employed. Optionally, under certain conditions, the driving mode may be selected autonomously by the autonomous driving module(s) 160.

For purposes of operational modes described herein, the vehicular hazard mitigation module 124 may operate alone or in cooperation with driving mode control module 161 and/or other modules or vehicle elements to control the driving mode of an associated vehicle. In one or more arrangements, the vehicular hazard mitigation module 124 may supersede the driving mode control module 161 or any other normal method or system in controlling the driving mode under the specific driving conditions described, but the vehicular hazard mitigation module 124 may otherwise be capable of performing all of the driving mode control functions of the superseded method/system. In other arrangements, the vehicular hazard mitigation module 124 may be configured to perform all the driving mode control functions under the special driving conditions described herein and also under "normal" driving conditions, where proximity to other vehicles in enhanced response driving modes is not an issue. In such embodiments, all of the driving mode control functions may be performed by the vehicular hazard mitigation module 124, and the driving mode control module 161 may be eliminated. In yet other arrangements, the driving mode control module 161 may be configured to perform all the driving mode control functions of the vehicular hazard mitigation module 124, under the traffic conditions described herein. In this case, the driving mode control module 161 essentially "becomes" the vehicular hazard mitigation module 124.

Embodiments of the vehicular hazard mitigation system described herein may be configured to control operation of the vehicle systems to switch the driving mode from a "sport mode", "sport-plus" mode or "super-sport" or other enhanced response driving mode to a non-enhanced response driving mode when the vehicle is in certain driving situations. For purposes of controlling shifting of the driving mode from an enhanced response driving mode to a non-enhanced response driving mode, the vehicle 100 may include a vehicular hazard mitigation module 124. The vehicular hazard mitigation module 124 may include computer-readable instructions that when executed by the processor(s) 110 cause the processor(s) to determine a base vehicle currently driving in an enhanced response driving mode. The base vehicle may be the vehicle 100. That is, in an embodiment where the vehicular hazard mitigation module 124 is located on the vehicle 100, if the vehicle 100 is determined to be driving in an enhanced driving mode, the vehicular hazard mitigation module 124 may operate on the vehicle 100 as described herein to change the driving mode of the vehicle.

The vehicular hazard mitigation module 124 may be configured to, if the vehicle 100 is determined to be driving in an enhanced driving mode, determine at least one alert zone of the base vehicle. An alert zone may be a predetermined area defined adjacent the vehicle 100 when the vehicle 100 is driving. Referring to FIG. 1, in one example, Alert zones of the vehicle 100 may include a front alert zone 251 and one or more lateral (i.e., right and/or left side) alert zones 252, 253.

Figure 2:
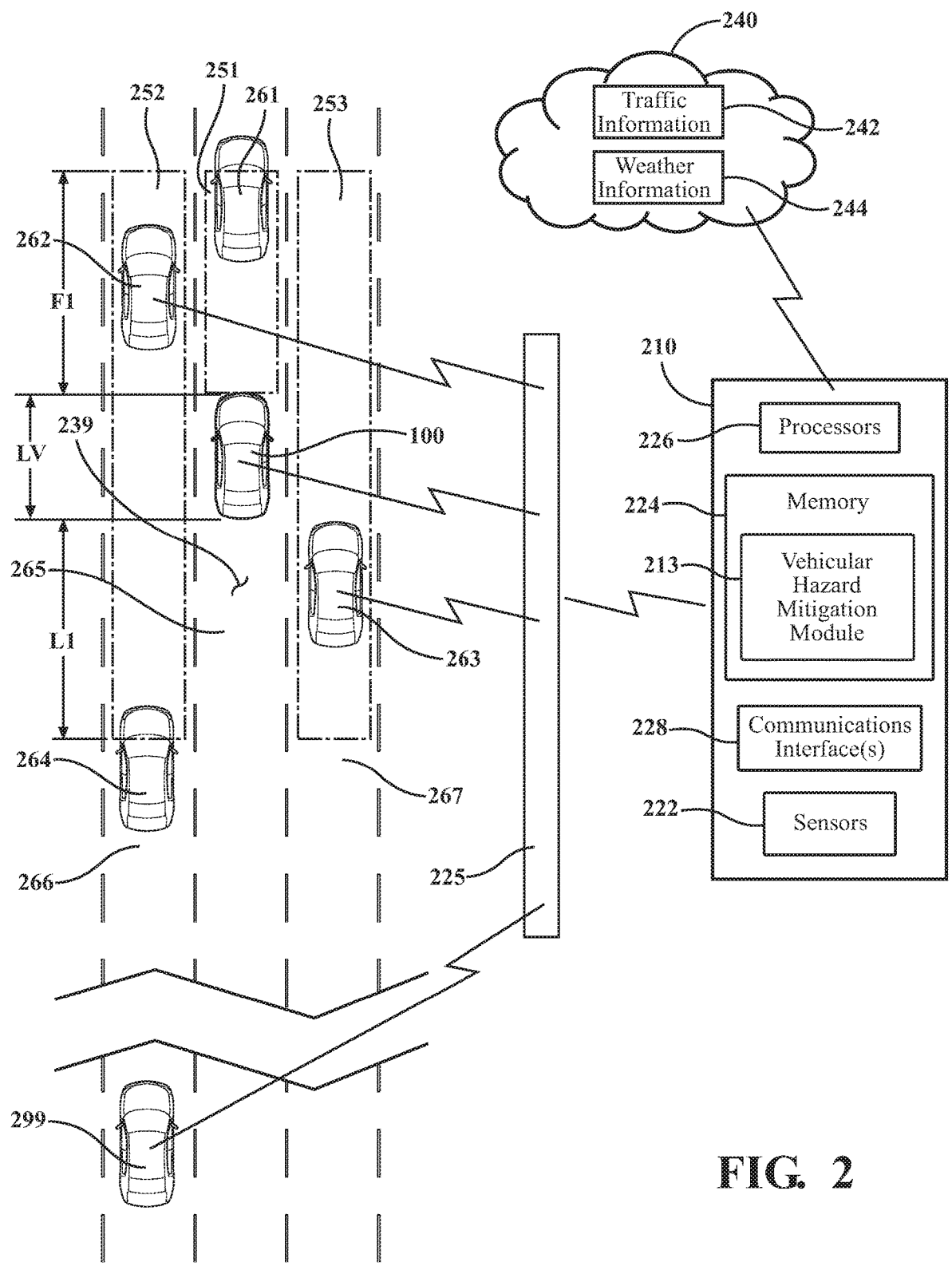
FIG. 2 is a block schematic diagram showing principles of operation of an embodiment of a vehicular hazard mitigation system described herein.

In one or more arrangements, the alert zones may be defined based on vehicle speed and a "two-second" safe following distance between vehicles. For example, referring to FIG. 2, a front alert zone 251 of the vehicle 100 may be defined as a zone ahead of the vehicle 100 and in the same lane of the vehicle 100. The zone may extend a distance F1 determined by a distance the vehicle 100 would travel in two seconds at a current speed of the vehicle. For example, at a speed of 40 mph, the vehicle would travel 117 feet in two seconds; thus, the front alert zone 251 would extend to 117 feet in front of the vehicle 100. In one or more arrangements, for an alert zone defined using the two-second distance rule, the length L1 of a front alert zone ahead of the vehicle 100 may be given by the relationship $F1=speedMPH \times 2.94$, where distance or length is expressed in feet and time in seconds. A lateral alert zone of the vehicle 100 may be an area in a lane adjacent to the lane of the vehicle 100, either to the left or right. As shown in FIG. 2, a length L1 of a lateral alert zone (such as an alert zone 252 or 253) may be equal to sum of the length of a two-second alert zone F1 ahead of the vehicle 100, a two-second alert zone L1 behind the vehicle 100, and a length LV of the vehicle (i.e., $L1=F1+L1+LV$). If a base vehicle is driving in a lane next to a road shoulder, only a single lateral alert zone may be defined for the base vehicle. Alert zones of a vehicle may be recalculated based on vehicle speed either constantly, periodically, or as needed, as long as the vehicle is traveling in an enhanced response driving mode. In addition, criteria other than a "two-second" safe following distance may be used to define characteristics of the alert zone.

The vehicular hazard mitigation module 124 may be configured to determine if any other vehicles are driving in any of the alert zones of the vehicle 100. For this purpose, vehicular hazard mitigation module 124 may be configured to receive and analyze sensor data from one or more of environment sensors 122. FIG. 2 shows an example of positioning of other vehicles 261, 262, 263, 264 in alert zones of the vehicle 100. If any portion of another vehicle is in a front alert zone 251 of the vehicle 100, the other vehicle is considered to be in the front alert zone 251. For another vehicle to be considered to be in one of the lateral alert zones 252, 253, the entire vehicle should be within the boundaries of the alert zone. Thus, the vehicles 262, 263 are in lateral alert zones 252, 253, respectively, of the vehicle 100, while the vehicle 264 is not in the lateral alert zone 252.

The vehicular hazard mitigation module 124 may be configured to, if at least one other vehicle is currently in any alert zone of the base vehicle 100, autonomously control operation of the base vehicle to shift the driving mode of the base vehicle from the enhanced response driving mode to a non-enhanced response driving mode. The non-enhanced response driving mode to which the driving mode will be switched may be pre-selected by a user, or a default driving mode (such as "normal") may be autonomously implemented.

In one or more arrangements, the vehicular hazard mitigation module 124 may be configured to generate an alert prior to controlling operation of the base vehicle 100 to shift the driving mode from an enhanced response driving mode to a non-enhanced response driving mode. The alert message may be configured to indicate to a driver of the base vehicle that the driving mode will be shifted from the enhanced response driving mode to the non-enhanced response driving mode after expiration of a predetermined time period unless the driver manually shifts the driving mode to a non-enhanced response driving mode prior to expiration of the predetermined time period. The driver may then shift the driving mode manually to an allowable (non-enhanced response) mode.

In one or more arrangements, an option may be enabled for the driver/user to manually override the autonomous shifting command, and the alert message may indicate that the driver can exercise the a manual override option to prevent shifting of the driving mode out of the enhanced response driving mode.

The vehicular hazard mitigation module 124 may be configured to generate at least one signal configured to control operation of at least one display of the base vehicle so as to display a position of each other vehicle in an alert zone of the base vehicle with respect to the base vehicle, after the relative positions of the other vehicles have been determined. This may provide a clear picture to the user of the spatial relationships between the base vehicle 100 and any vehicles currently traveling in an alert zone of the vehicle 100.

In one or more particular embodiments, the vehicular hazard mitigation module 124 may be configured to generate at least one signal containing information relating to the base vehicle and configured to control operation of at least one display of another vehicle not currently in an alert zone of the base vehicle, for purposes of displaying information relating to the base vehicle. This capability may be employed to transmit information to other vehicles (i.e., "distant vehicles") such as a vehicle 299 traveling behind the vehicle 100 and outside any of the alert zones. The information may relate to the vehicle 100 and/or any other vehicle detected as driving in an enhanced response driving mode and travelling ahead of the distant vehicle. This may warn a driver of the distant vehicle 299 that another vehicle driving some distance ahead is in an enhanced response driving mode. The distant driver(s) may wish to take steps to avoid driving near such a vehicle due to a perceived heightened risk of collision if the driver in the enhanced response driving mode vehicle drives more aggressively.

The vehicular hazard mitigation module 124 may also be configured to, after controlling operation of the base vehicle to shift the driving mode from the enhanced response driving mode to the non-enhanced response driving mode, determine if at least one other vehicle is still in the at least one alert zone of the base vehicle. If at least one other vehicle is still in the at least one alert zone of the base vehicle, the vehicular hazard mitigation module may autonomously control operation of the base vehicle to prevent shifting of the driving mode from the non-enhanced response driving mode to an enhanced response driving mode while at least one other vehicle is in an alert zone of the base vehicle. This function may prevent a user from intentionally or inadvertently switching to an enhanced driving mode while other vehicle(s) are driving in alert zone(s) of the vehicle 100.

The vehicular hazard mitigation module 124 may also be configured to, after controlling operation of the base vehicle to shift the driving mode from the enhanced response driving mode to the non-enhanced response driving mode, determine when no other vehicle is in an alert zone of the base vehicle. The vehicular hazard mitigation module 124 may be configured to, when it is determined that no other vehicle is in an alert zone of the base vehicle, autonomously control operation of the base vehicle to enable a user to shift the driving mode from the non-enhanced response driving mode to an enhanced response driving mode. Thus, when the alert zones are clear of other vehicles, the driver/user may safely re-engage a sport driving mode. Operation of the vehicle 100 may be controlled so as to generate a message to the driver that switching to an enhanced response mode has been re-enabled.

Referring to FIG. 2, in alternative embodiments of the vehicular hazard mitigation system, a vehicular hazard mitigation module 220 as described herein may be located on an edge device 210 positioned along a road 239 on which the vehicle 100 is traveling. In such arrangements, the edge device 210 may include sensors 222 configured to detect vehicles driving along the road 239. The edge device 210 may incorporate (or be in operable communication with) a memory 224 and processors 226 configured for performing the driving mode control operations described herein and associated operations. The edge device may include (or be in operable communication with) a communications interface 228. The communications interface 228 may be configured to communicate with any vehicle having user-selectable driving modes as described herein, to determine what driving mode the vehicle is driving in. The edge device 210 may be configured to generate control commands controlling the driving modes of various vehicles on the road 239 and to communicate (via communications interface 228) with the vehicle to convey the commands to the vehicles. Thus, the edge device 210 may control the driving mode of the vehicle 100 in the manner described here instead of the driving mode being controlled locally on the vehicle 100.

In particular arrangements, for embodiments where the vehicular hazard mitigation module resides on edge device, the vehicular hazard mitigation module may be configured to, for each other vehicle in an alert zone of the base vehicle, determine if the other vehicle is currently driving in an enhanced response driving mode. The vehicular hazard mitigation module 213 may query the vehicles driving within range of the edge device sensors to determine what driving modes the vehicles are in, until a base vehicle (such as the vehicle 100) driving in an enhanced response driving mode is determined. The edge device vehicular hazard mitigation module 213 may then determine alert zones for the base vehicle driving in the enhanced response driving mode, as previously described. The edge device vehicular hazard mitigation module 213 may be configured to determine if any other vehicles are driving in any alert zone of the base vehicle, as previously described. The edge device vehicular hazard mitigation module 213 may be configured to, if at least one other vehicle is currently in an alert zone of the base vehicle, autonomously control operation of the base vehicle to shift the driving mode of the base vehicle from the enhanced response driving mode to a non-enhanced response driving mode, as previously described.

Also as previously described, the edge device vehicular hazard mitigation module 213 may be configured to, after the pertinent vehicle driving modes have been shifted, control operation of the base vehicle to prevent shifting of the driving mode from a non-enhanced response driving mode to an enhanced response driving mode while any other vehicles are in an alert zone of the base vehicle, as previously described. The edge device vehicular hazard mitigation module 213 may also be configured to, after controlling operation of the base vehicle to shift the driving mode from the enhanced response driving mode to the non-enhanced response driving mode, determine when no other vehicle is in an alert zone of the base vehicle. The edge device vehicular hazard mitigation module 213 may be configured to, when it is determined that no other vehicle is in an alert zone of the base vehicle, autonomously control operation of the base vehicle to enable a user to shift the driving mode from the non-enhanced response driving mode to an enhanced response driving mode. Thus, when the alert zones are clear of other vehicles, the driver/user may safely re-engage a sport driving mode. Operation of the vehicle 100 may be controlled so as to generate a message to the driver that switching to an enhanced response mode has been re-enabled.

In addition, the edge device vehicular hazard mitigation module 213 may be configured to, for each other vehicle in an alert zone of the base vehicle, determine if the other vehicle is currently driving in an enhanced response driving mode. The edge device vehicular hazard mitigation module may be configured to, if the other vehicle is currently driving in an enhanced response driving mode, autonomously control operation of the other vehicle to shift the driving mode of the other vehicle from the enhanced response driving mode to a non-enhanced response driving mode. This capability enables the edge device vehicular hazard mitigation module 213 to control the driving modes of several relatively closely-spaced vehicles to ensure that the vehicles all drive in non-enhanced response driving modes until the vehicles are spaced apart a sufficient distance to reduce the risk of accident from one or more drivers driving in an enhanced response driving mode.

The edge device vehicular hazard mitigation module may be configured to generate alert messages to the drivers of the other vehicles traveling in the alert zones of the base vehicle in enhanced response driving modes, as previously described. The messages may, for example, alert the drivers that the driving modes of their respective vehicles will be changed after expiration of a predetermined time period if the drivers do not shift the respective driving modes. The edge device vehicular hazard mitigation module may be configured to, as previously described and after any other vehicle driving mode(s) have been shifted, control operation of each vehicle in an alert zone of the base vehicle to prevent shifting of the vehicle driving mode from a non-enhanced response driving mode to an enhanced response driving mode while the vehicle is still in an alert zone of the base vehicle, as previously described.

The edge device vehicular hazard mitigation module 213 may also be configured to, after controlling operation of the other vehicle to shift the driving mode of the other vehicle from the enhanced response driving mode to the non-enhanced response driving mode, determine when the other vehicle is no longer in an alert zone of the base vehicle. The edge device vehicular hazard mitigation module may be configured to, when it is determined that the other vehicle no longer in an alert zone of the base vehicle, autonomously control operation of the other vehicle to enable a user to shift the driving mode of the other vehicle from the non-enhanced response driving mode to an enhanced response driving mode. Thus, when the other vehicle is no longer in an alert zone of the base vehicle, the driver/user of the other vehicle may safely re-engage a sport driving mode. The edge device vehicular hazard mitigation module may be configured to generate a message to the driver of the other vehicle that switching to an enhanced response mode has been re-enabled.

Various other resources may be located on servers on cloud 240 or other devices. These cloud sources may include sources for weather information 242 and traffic information 244. The vehicle 100 and/or edge device 210 may be configured for communication with the cloud devices 240, to aid in performance of the driving mode control functions described herein and for other purposes.

FIGS. 3 and 4 are flow diagrams illustrating operation of embodiments of the vehicular hazard mitigation system as described herein. Operations shown in FIG. 3 (involving control of the driving mode of the base vehicle) may be managed by a vehicular hazard mitigation module located either on the base vehicle or on an edge device as previously described. For purposes of description, operations in FIG. 3 will be described from the perspective of a vehicular hazard mitigation module 124 located on the vehicle 100. Operations shown in FIG. 4 (involving control of the driving modes of vehicles other than the base vehicle) may generally be managed by a vehicular hazard mitigation module 213 located on an edge device, such as edge device 210.

Referring to FIG. 3, in block 302, the vehicular hazard mitigation module 124 may determine or identify a base vehicle (such as vehicle 100) currently driving in an enhanced response driving mode. In block 304, the vehicular hazard mitigation module 124 may determine alert zones for the base vehicle 100, as previously described. In block 306, the vehicular hazard mitigation module 124 may determine if any other vehicle is currently in an alert zone of the base vehicle 100. If no other vehicle is currently in an alert zone of the base vehicle, control may pass to block 308, where the vehicular hazard mitigation module 124 may determine if the base vehicle is still driving in an enhanced response driving mode. If the original base vehicle is not still driving in an enhanced response driving mode, the vehicular hazard mitigation module 124 may attempt to identify another base vehicle currently driving in an enhanced response driving mode (block 302). However, if the original base vehicle is still driving in an enhanced response driving mode, control may transfer back to block 306. This sequence may repeat until another vehicle enters an alert zone of the base vehicle.

When another vehicle is determined to be in an alert zone of the base vehicle, the vehicular hazard mitigation module 124 may (in block 314) flag all of the other vehicles in the alert zones of the base vehicle. The other vehicles may be tagged with identifiers which may be stored in a memory so that the vehicles can be identified while they are in the alert zones of the base vehicle. Information regarding the other vehicles may be used to track when the other vehicles leave the alert zones and/or re-enter the alert zones. Any new vehicles entering an alert may also be tagged for reference. Information regarding the other vehicles may also be used by an edge device vehicular hazard mitigation module 213 to control driving modes of the other vehicles as described herein. In an embodiment of the vehicular hazard mitigation module 213 located on an edge device, the other vehicles driving in the alert zones may also be queried for other information, if necessary, in order to enable the edge server vehicular hazard mitigation module to perform the driving mode control functions described herein.

The vehicular hazard mitigation module 124 may also (in block 328) control operation of a display of the base vehicle to display positions of all the other vehicles currently in alert zones of the base vehicle. The positions of the other vehicle relative to each other and relative to the base vehicle may be displayed. In block 330, the vehicular hazard mitigation module 124 may then (or simultaneously with block 328) generate at least one signal configured to control operation of at least one display of another vehicle outside any alert zone of the base vehicle 100, and containing information relating to the base vehicle 100.

Returning to block 306, when another vehicle is determined to be in an alert zone of the base vehicle, the vehicular hazard mitigation module 124 may also (in block 310) control operation of the base vehicle to generate an alert message to a user/driver of the of base vehicle. The message may be directed to informing the user/driver that the driving mode will be switched autonomously when a predetermined time period expires if the driving mode has not been switched manually. The alert message may include an autonomous driving mode shifting command override option as previously described, if the vehicle 100 is provided with one.

Control may then pass to block 312, where the vehicular hazard mitigation module 124 may determine if the user overrode the autonomous control of the driving mode. If the user overrode the autonomous control of the driving mode, control may pass to block 315, where the enhanced response driving mode may be maintained. However, if the user did not override the autonomous control of the driving mode, the vehicular hazard mitigation module 124 may (in block 318) determine if the base vehicle is still driving in an enhanced response driving mode (i.e., whether or not the user shifted the driving zone manually). If the base vehicle is still driving in an enhanced response driving mode after expiration of the predetermined time period, the vehicular hazard mitigation module 124 may (in block 320) autonomously control operation of the base vehicle to shift the driving mode from the enhanced response driving mode to a non-enhanced response driving mode.

After controlling operation of the base vehicle to shift the driving mode to a non-enhanced response driving mode, the vehicular hazard mitigation module 124 may (in block 322) determine if any other vehicles are still in alert zones of the base vehicle. If any other vehicles are still in alert zones of the base vehicle, the vehicular hazard mitigation module 124 may (in block 324) autonomously control operation of the base vehicle to prevent shifting of the base vehicle driving mode from the non-enhanced response driving mode to an enhanced response driving mode. This control may be in effect as long as any other vehicles are in an alert zone of the base vehicle. However, if no other vehicles are still in alert zones of the base vehicle, the vehicular hazard mitigation module 124 may (in block 326) autonomously control operation of the base vehicle to enable a user to shift the base vehicle driving mode from the non-enhanced response driving mode to an enhanced response driving mode.

FIG. 4 is a flow diagram showing one embodiment of a control scheme for the driving mode of a vehicle other than the base vehicle, where the other vehicle is driving in an alert zone of the base vehicle. The control scheme will be described for implementation in a single vehicle. However, the control scheme shown may be implemented independently for each other vehicle driving in any alert zone of the base vehicle, and each other vehicle may be controlled in parallel and simultaneously in the manner described. For example, the driving modes of each of other vehicles 261, 262, and 263 (FIG. 2) may be controlled as described in FIG. 4 because these vehicles are considered to be in alert zones of the base vehicle 100.

As previously described, control of the other vehicle driving modes may be managed by a vehicular hazard mitigation module (such as module 213) located on an edge device 210 in operable communication with the other vehicles. Alternatively, control of the driving modes of the other vehicles may be managed by a vehicular hazard mitigation module located elsewhere (such as in cloud 240).

In block 404, the vehicular hazard mitigation module 213 may determine if the other vehicle is currently driving in an enhanced response driving mode. If the other vehicle is not driving in an enhanced response driving mode, the driving mode of the other vehicle does not need to be shifted by the vehicular hazard mitigation module 213. Then, the vehicular hazard mitigation module 213 may (in block 406) determine if the other vehicle is still in an alert zone of the base vehicle. If the other vehicle is not still in an alert zone of the base vehicle, the control routine may end. If, however, the other vehicle is still in an alert zone of the base vehicle, control may revert back to block 404 to determine if the other vehicle has shifted to an enhanced response driving mode in the interim.

Returning to block 404, if the other vehicle is currently driving in an enhanced response mode, the vehicular hazard mitigation module 213 may (in block 408) control operation of the other vehicle to generate an alert message to a user/driver of the other vehicle. The message may be directed to informing the user/driver that the other vehicle driving mode will be switched autonomously when a predetermined time period expires if the driving mode has not been switched manually. The alert message may include an autonomous driving mode shifting command override option as previously described, if the other vehicle is provided with one. Control may then pass to block 410, where the vehicular hazard mitigation module 213 may determine if the user overrode the autonomous control of the other vehicle driving mode. If the user overrode the autonomous control of the driving mode, control may pass to block 412, where the enhanced response driving mode may be maintained.

However, if the user did not override the autonomous control of the other vehicle driving mode, the vehicular hazard mitigation module 213 may (in block 414) determine if the other vehicle is still driving in an enhanced response driving mode (i.e., whether or not the user shifted the driving zone manually). If the base vehicle is not still driving in an enhanced response driving mode, the vehicular hazard mitigation module 213 may (in block 418) determine if the other vehicle still in an alert zone of the base vehicle. If the other vehicle is still in an alert zone of the base vehicle, the vehicular hazard mitigation module 213 may (in block 420) autonomously control operation of the other vehicle to prevent shifting of the other vehicle driving mode from the non-enhanced response driving mode to an enhanced response driving mode. This control may be in effect as long as the other vehicle is in an alert zone of the base vehicle. However, if the other vehicle is not still in an alert zone of the base vehicle, the vehicular hazard mitigation module 213 may (in block 422) autonomously control operation of the other vehicle to enable a user to shift the other vehicle driving mode from the non-enhanced response driving mode to an enhanced response driving mode.

Returning to block 414, if the other vehicle is still driving in an enhanced response driving mode, the vehicular hazard mitigation module 213 may (in block 416) autonomously control operation of the base vehicle to shift the driving mode from the enhanced response driving mode to a non-enhanced response driving mode. After controlling operation of the base vehicle to shift the driving mode to a non-enhanced response driving mode, control may pass to block 418 and subsequent blocks as previously described.

In another aspect of the embodiments described herein, a method is provided for controlling a driving mode of a vehicle is provided. The method includes a step of (a) determining a base vehicle currently driving in an enhanced response driving mode. In a step (b), at least one alert zone of the base vehicle is then determined. In a step (c), a determination is then made as to whether at least one other vehicle is currently in the at least one alert zone of the base vehicle. In a step (d), if at least one other vehicle is currently in the at least one alert zone of the base vehicle, operation of the base vehicle is autonomously controlled to shift the driving mode of the base vehicle from the enhanced response driving mode to a non-enhanced response driving mode. If at least one other vehicle is not currently in the at least one alert zone of the base vehicle, steps (b)-(d) are repeated until the base vehicle is no longer driving in an enhanced response driving mode.

The method may further include a step of, after controlling operation of the base vehicle to shift the driving mode of the vehicle from the enhanced response driving mode to the non-enhanced response driving mode, determining if at least one other vehicle is still in the at least one alert zone of the base vehicle. The method may further include a step of, if at least one other vehicle is still in the at least one alert zone of the base vehicle, autonomously controlling operation of the base vehicle to prevent shifting of the driving mode from the non-enhanced response driving mode to an enhanced response driving mode while at least one other vehicle is in an alert zone of the base vehicle. The method may further include a step of, if at least one other vehicle is not still in the at least one alert zone of the base vehicle, autonomously controlling operation of the base vehicle to enable a user to shift the driving mode from the non-enhanced response driving mode to an enhanced response driving mode.

In yet another aspect of the embodiments described herein, a non-transitory computer-readable medium is provided for controlling a driving mode of a vehicle and storing instructions that when executed by one or more processors cause the processor(s) to (a) determine a base vehicle currently driving in an enhanced response driving mode; (b) determine at least one alert zone of the base vehicle; (c) determine if at least one other vehicle is currently in the at least one alert zone of the base vehicle; (d) if at least one other vehicle is currently in the at least one alert zone of the base vehicle, autonomously control operation of the base vehicle to shift the driving mode of the base vehicle from the enhanced response driving mode to a non-enhanced response driving mode; and (e) if at least one other vehicle is not currently in the at least one alert zone of the base vehicle, repeat steps (b)-(e) until the base vehicle is no longer driving in an enhanced response driving mode.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicular hazard mitigation system comprising:
one or more processors; and
a memory communicably coupled to the one or more processors and storing a vehicular hazard mitigation module including computer-readable instructions that when executed by the one or more processors cause the one or more processors to:
determine a base vehicle currently driving in an enhanced response driving mode;
determine at least one alert zone of the base vehicle;
determine if at least one other vehicle is currently in the at least one alert zone of the base vehicle;
if at least one other vehicle is currently in the at least one alert zone of the base vehicle, autonomously control operation of the base vehicle to shift a driving mode of the base vehicle from the enhanced response driving mode to a non-enhanced response driving mode;
for each other vehicle in an alert zone of the base vehicle:
a) determine if the other vehicle is currently driving in an enhanced response driving mode of the other vehicle; and
b) if the other vehicle is currently driving in an enhanced response driving mode of the other vehicle, autonomously control operation of the other vehicle to shift a driving mode of the other vehicle from the enhanced response driving mode of the other vehicle to a non-enhanced response driving mode of the other vehicle.

2. The vehicular hazard mitigation system of claim 1 wherein the at least one alert zone is a lateral alert zone.

3. The vehicular hazard mitigation system of claim 1 wherein the at least one alert zone is a front alert zone.

4. The vehicular hazard mitigation system of claim 1 wherein the vehicular hazard mitigation module includes computer-readable instructions that when executed by the one or more processors cause the one or more processors to:
after controlling operation of the base vehicle to shift the driving mode of the base vehicle from the enhanced response driving mode to the non-enhanced response driving mode, determine if at least one other vehicle is still in the at least one alert zone of the base vehicle; and
if at least one other vehicle is still in the at least one alert zone of the base vehicle, autonomously control operation of the base vehicle to prevent shifting of the driving mode from the non-enhanced response driving mode to an enhanced response driving mode while at least one other vehicle is in an alert zone of the base vehicle.

5. The vehicular hazard mitigation system of claim 4 wherein the vehicular hazard mitigation module includes computer-readable instructions that when executed by the one or more processors cause the one or more processors to:
determine when no other vehicle is in an alert zone of the base vehicle; and
when no other vehicle is in an alert zone of the base vehicle, autonomously control operation of the base vehicle to enable a user to shift the base vehicle driving mode from the non-enhanced response driving mode to an enhanced response driving mode.

6. The vehicular hazard mitigation system of claim 1 wherein the vehicular hazard mitigation module includes computer-readable instructions that when executed by the one or more processors cause the one or more processors to:
prior to controlling operation of the base vehicle to shift the driving mode of the base vehicle from the enhanced response driving mode to the non-enhanced response driving mode, control operation of the base vehicle to generate an alert configured to indicate to a user of the base vehicle that the driving mode of the base vehicle will be shifted from the enhanced response driving mode to the non-enhanced response driving mode after expiration of a predetermined time period unless a user manually shifts the driving mode to a non-enhanced response driving mode prior to expiration of the predetermined time period;
after expiration of the predetermined time period, determining if the base vehicle is still driving in an enhanced response driving mode; and
if the base vehicle is still driving in an enhanced response driving mode after expiration of the predetermined time period, control operation of the base vehicle to shift the driving mode of the base vehicle from the enhanced response driving mode to a non-enhanced response driving mode.

7. The vehicular hazard mitigation system of claim 1 wherein the vehicular hazard mitigation module includes computer-readable instructions that when executed by the one or more processors cause the one or more processors to generate at least one signal configured to control operation of at least one display of the base vehicle so as to display a position of each other vehicle in an alert zone of the base vehicle with respect to the base vehicle.

8. The vehicular hazard mitigation system of claim 1 wherein the vehicular hazard mitigation module includes computer-readable instructions that when executed by the one or more processors cause the one or more processors to generate at least one signal containing information relating to the base vehicle and configured to control operation of at least one display of another vehicle not currently in an alert zone of the base vehicle to display information relating to the base vehicle.

9. The vehicular hazard mitigation system of claim 1 wherein the vehicular hazard mitigation module includes computer-readable instructions that when executed by the one or more processors cause the one or more processors to:
prior to controlling operation of the other vehicle to shift the driving mode of the other vehicle from the enhanced response driving mode to the non-enhanced response driving mode, control operation of the other vehicle to generate an alert configured to indicate to a user of the other vehicle that the driving mode of the other vehicle will be shifted from the enhanced response driving mode to the non-enhanced response driving mode after expiration of a predetermined time period unless a user manually shifts the driving mode to a non-enhanced response driving mode prior to expiration of the predetermined time period; and
control operation of the other vehicle to shift the driving mode of the other vehicle from the enhanced response driving mode to a non-enhanced response driving mode after expiration of the predetermined time period.

10. The vehicular hazard mitigation system of claim 1 wherein the vehicular hazard mitigation module includes computer-readable instructions that when executed by the one or more processors cause the one or more processors to generate at least one signal containing information relating to the base vehicle and configured to control operation of at least one display of another vehicle not currently in an alert zone of the base vehicle, to display information relating to the base vehicle and/or any other vehicle determined to be driving in an enhanced response driving mode and travelling ahead of the distant vehicle.

11. The vehicular hazard mitigation system of claim 1 wherein the vehicular hazard mitigation module includes computer-readable instructions that when executed by the one or more processors cause the one or more processors to, after the driving mode of the other vehicle has been shifted, control operation of the other vehicle to prevent shifting of the driving mode of the other vehicle from a non-enhanced response driving mode to an enhanced response driving mode while the other vehicle is still in an alert zone of the base vehicle.

12. The vehicular hazard mitigation system of claim 1 wherein the vehicular hazard mitigation module includes computer-readable instructions that when executed by the one or more processors cause the one or more processors to:
determine when the other vehicle is no longer in an alert zone of the base vehicle; and
responsive to a determination that the other vehicle no longer in an alert zone of the base vehicle, autonomously control operation of the other vehicle to enable a user of the other vehicle to shift the driving mode of the other vehicle from the non-enhanced response driving mode to an enhanced response driving mode.

13. A method of controlling a driving mode of a vehicle, the method comprising steps of:
a) determining a base vehicle currently driving in an enhanced response driving mode;
b) determining at least one alert zone of the base vehicle;
c) determining if at least one other vehicle is currently in the at least one alert zone of the base vehicle;
d) if at least one other vehicle is currently in the at least one alert zone of the base vehicle, autonomously controlling operation of the base vehicle to shift a driving mode of the base vehicle from the enhanced response driving mode to a non-enhanced response driving mode;
e) if at least one other vehicle is not currently in the at least one alert zone of the base vehicle, repeating steps (b)-(d) until the base vehicle is no longer driving in an enhanced response driving mode;
for each other vehicle in an alert zone of the base vehicle:
f) determining that the other vehicle is currently driving in an enhanced response driving mode of the other vehicle; and
g) responsive to the determination that the other vehicle is currently driving in an enhanced response driving mode of the other vehicle, autonomously controlling operation of the other vehicle to shift a driving mode of the other vehicle from the enhanced response driving mode of the other vehicle to a non-enhanced response driving mode of the other vehicle.

14. The method of claim 13 further comprising steps of:
after controlling operation of the base vehicle to shift the driving mode of the vehicle from the enhanced response driving mode to the non-enhanced response driving mode, determine if at least one other vehicle is still in the at least one alert zone of the base vehicle;
if at least one other vehicle is still in the at least one alert zone of the base vehicle, autonomously controlling operation of the base vehicle to prevent shifting of the driving mode from the non-enhanced response driving mode to an enhanced response driving mode while at least one other vehicle is in an alert zone of the base vehicle; and
if at least one other vehicle is not still in the at least one alert zone of the base vehicle, autonomously controlling operation of the base vehicle to enable a user to shift the driving mode from the non-enhanced response driving mode to an enhanced response driving mode.

15. The method of claim 13 further comprising the step of, prior to controlling operation of the base vehicle to shift the driving mode of the base vehicle from the enhanced response driving mode to the non-enhanced response driving mode, controlling operation of the base vehicle to generate an alert configured to indicate to a user of the base vehicle that the driving mode of the base vehicle will be shifted from the enhanced response driving mode to the non-enhanced response driving mode after expiration of a predetermined time period unless the user manually shifts the driving mode to a non-enhanced response driving mode prior to expiration of the predetermined time period.

16. A non-transitory computer-readable medium for controlling a driving mode of a vehicle and storing instructions that when executed by one or more processors cause the one or more processors to:
a) determine a base vehicle currently driving in an enhanced response driving mode;
b) determine at least one alert zone of the base vehicle;
c) determine if at least one other vehicle is currently in the at least one alert zone of the base vehicle;
d) if at least one other vehicle is currently in the at least one alert zone of the base vehicle, autonomously control operation of the base vehicle to shift a driving mode of the base vehicle from the enhanced response driving mode to a non-enhanced response driving mode;
e) if at least one other vehicle is not currently in the at least one alert zone of the base vehicle, repeat steps (b)-(e) until the base vehicle is no longer driving in an enhanced response driving mode;

for each other vehicle in an alert zone of the base vehicle:
f) determine that the other vehicle is currently driving in an enhanced response driving mode of the other vehicle; and
g) responsive to the determination that the other vehicle is currently driving in an enhanced response driving mode of the other vehicle, autonomously control operation of the other vehicle to shift a driving mode of the other vehicle from the enhanced response driving mode of the other vehicle to a non-enhanced response driving mode of the other vehicle.

\* \* \* \* \*